July 20, 1965 H. L. LATHAM, JR 3,196,364
SHIELDED DIFFERENTIAL AMPLIFIER
Filed May 16, 1961
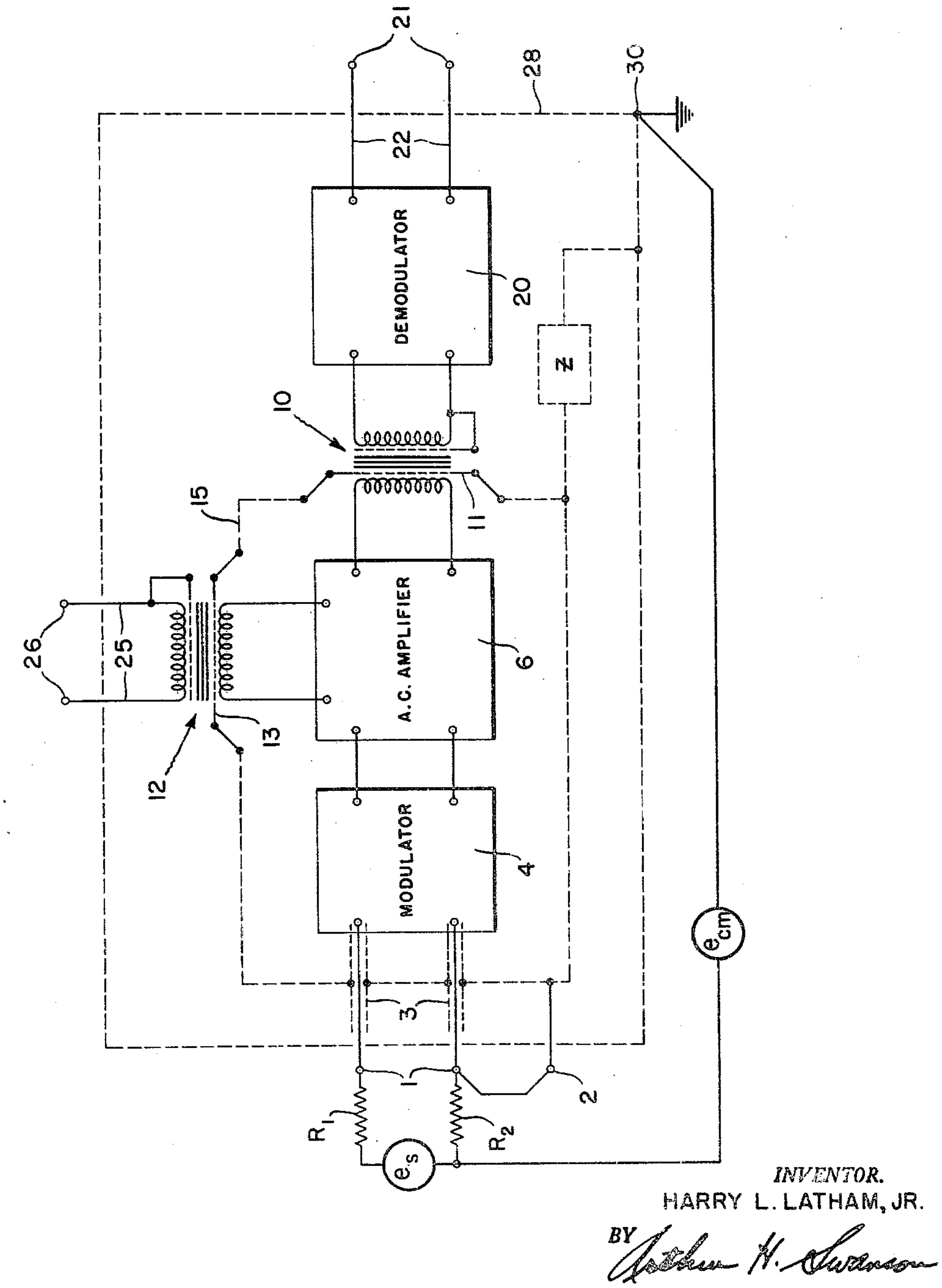
INVENTOR.
HARRY L. LATHAM, JR.
BY Arthur H. Swanson
ATTORNEY.

United States Patent Office 3,196,364

Patented July 20, 1965

3,196,364

SHIELDED DIFFERENTIAL AMPLIFIER

Harry L. Latham, Jr., Philadelphia, Pa., assignor to Honeywell Inc., a corporation of Delaware Filed May 16, 1961, Ser. No. 110,448
1 Claim. (Cl. 330—68)

This invention relates to amplifiers. More specifically, the present invention relates to differential amplifiers.

An object of the present invention is to provide an improved differential amplifier.

Another object of the present invention is to provide an improved differential amplifier which is characterized by the ability to amplify desired signals while neutralizing the effect of spurious, or so-called common-mode, input signals applied thereto.

A further object of the present invention is to provide an improved differential amplifier, as set forth herein, which is characterized by a simplicity of operation and construction.

In accomplishing these and other objects, there has been provided, in accordance with the present invention, a differential amplifier having an input signal modulator for converting unidirectional current input signals to alternating current signals. An alternating current amplifier is used to amplify the modulated input signals. The amplified input signals are applied to a demodulator through a coupling transformer having an electrostatically shielded primary winding. The amplifier is supplied with an energizing signal from a power transformer having an electrostatically shielded secondary. The amplifier and modulator are surrounded by a first electrostatic shield which shield is connected to the aforesaid shields of the power transformer and the coupling transformer. A second electrostatic shield surrounds the first electrostatic shield, the power transformer, the coupling transformer and the demodulator. The second shield is not connected to the first shield and all the input connections to the components within the shield are not connected to the first or second shields.

A better understanding of the present invention may be had when the following description is read in connection with the accompanying drawings, in which the single figure represents a schematic illustration of a differential amplifier embodying the present invention.

Referring to the single figure in more detail, there is shown a differential amplifier having a pair of input terminals 1 and a shield terminal 2. The input terminals 1 are connected by shielded wires 3 to a signal modulator 4. The signal modulator 4 may be any suitable device for converting a unidirectional signal to a corresponding alternating current signal; such devices being well-known in the art.

The converted signal is applied to an alternating current amplifier 6. The amplified converted signal is applied to the primary winding of a coupling transformer 10. The coupling transformer 10 has an electrostatic shield 11 around the aforesaid primary winding. A power transformer 12 is used to supply an energizing signal to the amplifier 6. The power transformer 12 has an electrostatic shield 13 around the secondary winding thereof.

A first electrostatic amplifier shield 15 is arranged to enclose the modulator 4 and the amplifier 6. The aforesaid electrostatic shields 11 and 13 are connected to the amplifier shield 15 to enclose the primary winding of the coupling transformer 10 and the secondary winding of the power transformer 12 within the amplifier shield 15. Further, the shields of the input wires 3 are connected to the amplifier shield 15.

The secondary winding of the coupling transformer 10 is connected to a demodulator 20 for converting an alternating current signal to a corresponding unidirectional signal. The output signal from the demodulator 20 is coupled to a pair of output terminals 21 by a pair of connecting wires 22.

The primary winding of the power transformer 12 is coupled by a pair of connecting wires 25 to a pair of energizing signal terminals 26. An outside shield 28 is arranged to enclose the amplifier shield 15, the power transformer 12, the coupling transformer 10 and the demodulator 20. The input leads 3 are arranged to pass through the outside shield 28 without contacting the outside shield 28. Similarly, the connecting wires 22 to the output terminals 21 and the connecting wires 25 to the signal terminals 26 are arranged to pass through the outside shield 28 without contacting the shield 28. The outside shield 28 is connected to a ground terminal 30 at a single place thereon.

The mode of operation of the present invention follows:

Assume a source of unidirectional input signals $e_s$ is connected to the input terminals 1 by a pair of connecting leads having lead resistances $R_1$ and $R_2$, respectively. Further, assume a source of spurious, or so-called common mode, signals $e_{cm}$ is effective to apply a spurious signal between one side of the input signal source $e_s$ and the ground connection 30. The unidirectional input signals from thesource $e_s$ are modulated by the modulator 4 to corresponding alternating current signals. These alternating current signals are amplified by the alternating current amplifier 6. The amplified signals from the amplifier 6 is coupled by the coupling transformer 10 to the demodulator 20. The demodulator 20 is arranged to be synchronously operated with the modulator 4 to convert the alternating current signal applied thereto to a corresponding unidirectional signal.

The outside case 28 is effective to present an electrostatic shield to spurious signal and to conduct spurious signals induced therein to the common ground connection 30. The amplifier shield 15 is further effective to present an electrostatic shield to spurious signal for the modulator 4, the amplifier 6, the primary of the coupling transformer 10 and the secondary of the transformer 12. Additionally, the outside case 28 and the amplifier shield 15 are normally electrically isolated from the input terminals 1. A connection to a ground terminal of one of the input terminals 1 may be made with this arrangement without connecting an input terminal to the outside case 28. The possibility of introducing spurious signals induced in the outside case 28 to the amplifier 6 is thus eliminated and the neutralization of existing spurious signals from the source $e_{cm}$ is obtained as follows:

As previously discussed, the amplifier shield 15 does not touch the outside case 28. However, a leakage impedance Z comprising leakage capacitance and resistance may be seen to exist between these elements. The shield terminal 2 is arranged to be connected by a jumper wire to one of the input terminals 1. Thus, a path for the spurious signal from the source $e_{cm}$ is seen to be from one side of the source $e_{cm}$ through the lead resistance $R_2$, the jumper wire to the shield terminal 2, the impedance Z, to the ground terminal 30 to the other side of the source $e_{cm}$. Accordingly the lead resistance $R_2$ and the impedance Z form a signal divider for the spurious signal.

A definition of the ability of the differential amplifier of the present invention to neutralize, or reject, a spurious signal may be as follows:

$$\text{Rejection Ratio} = \frac{Z}{R_2}$$

This definition is based on an analysis of the circuit wherein the common-mode rejection of the coupling transformer 10 is seen to be relatively insignificant compared to the aforesaid signal dividing effect. It may be seen that the leakage impedance Z has a very high numerical value to represent a high impedance path and the lead resistance $R_2$ has a very low numerical value to correspond to the lead resistance of the connecting wire. Thus, the aforesaid ratio may have a value such as $1 \times 10^8$, which ratio is indicative of a high degree of ability to reject the aforesaid spurious signal. Accordingly, the output signal appearing at the output terminals 21 is nearly completely free from the effects of the spurious signal applied by the source $e_{cm}$.

Thus, it may be seen that there has been provided, in accordance with the present invention, a differential amplifier which is characterized by the ability to neutralize the effects of spurious signals while amplifying desired input signals applied thereto.

What is claimed is:

A differential amplifier comprising modulating means for converting a unidirectional input signal to a corresponding alternating current signal, an alternating current amplifying means, means connecting said alternating current signal as an input signal to said amplifying means, a coupling transformer having a primary winding, an electrostatic shield enclosing said primary winding and a secondary winding, means connecting said primary winding to an output signal from said amplifying means, a power transformer for supplying an energizing signal to said amplifying means, said power transformer having a secondary winding, an electrostatic shield enclosing said secondary winding and a primary winding, a first electrostatic shield, said first shield enclosing said modulating means and said amplifying means, means connecting said shields of said coupling transformer and said power transformer to said first shield to enclose the shielded windings of said transformers within said first shield, a second electrostatic shield, said second shield enclosing said first shield and the remaining windings of said transformers, a pair of input signal terminals, means connecting said input terminals to said modulating means to apply an input signal thereto, said means connecting said input terminals passing through said first shield and said second shield without a direct connection to said shields, and means for connecting any one of said input terminals to said first shield.

References Cited by the Examiner

UNITED STATES PATENTS

| | | | |
|---|---|---|---|
| 2,137,278 | 11/38 | George et al. | 330—68 X |
| 2,170,050 | 8/39 | Gandtner | 330—68 X |
| 2,896,096 | 7/59 | Schwarzer | 250—16 X |
| 2,931,985 | 4/60 | Offner | 330—69 X |
| 3,100,282 | 8/63 | Fletcher | 330—68 |

ROY LAKE, *Primary Examiner.*

NATHAN KAUFMAN, *Examiner.*